(12) United States Patent
Komiya et al.

(10) Patent No.: US 8,617,706 B2
(45) Date of Patent: Dec. 31, 2013

(54) PELLETS COMPRISING POLYMER AND PACKAGE CONTAINING THE SAME

(75) Inventors: Kan Komiya, Ichihara (JP); Tetsuya Nakamura, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 513 days.

(21) Appl. No.: 12/310,017

(22) PCT Filed: Aug. 6, 2007

(86) PCT No.: PCT/JP2007/065348
§ 371 (c)(1),
(2), (4) Date: Feb. 6, 2009

(87) PCT Pub. No.: WO2008/018404
PCT Pub. Date: Feb. 14, 2008

(65) Prior Publication Data
US 2009/0321300 A1  Dec. 31, 2009

(30) Foreign Application Priority Data
Aug. 11, 2006  (JP) .................................. 2006-220649

(51) Int. Cl.
*B32B 5/16* (2006.01)
(52) U.S. Cl.
USPC ......................................... 428/402; 206/584
(58) Field of Classification Search
USPC ......................................... 428/402; 206/584
See application file for complete search history.

(56) References Cited

U.S. PATENT DOCUMENTS

| 5,145,742 | A | 9/1992 | Yau |
| 5,942,304 | A | 8/1999 | Somers |
| 6,067,776 | A | 5/2000 | Heuer |
| 7,122,584 | B2 * | 10/2006 | Moriya et al. ................ 523/205 |
| 2001/0005516 | A1 | 6/2001 | Yoshii et al. |
| 2004/0082690 | A1 | 4/2004 | Kawahara et al. |

FOREIGN PATENT DOCUMENTS

| JP | 3-261512 A | 11/1991 |
| JP | 7-118394 A | 5/1995 |
| JP | 2000-43039 A | 2/2000 |
| JP | 2001-96530 A | 4/2001 |
| JP | 2001-179734 A | 7/2001 |
| JP | 2003-026814 | 1/2003 |
| WO | WO 92/02569 | 2/1992 |
| WO | WO 02/085979 A1 | 10/2002 |

OTHER PUBLICATIONS

Supplementary European Search Report EP Application No. 07792021 dated Mar. 4, 2013.
Office Action Japanese Application No. 2008-528808 dated Feb. 12, 2013.

* cited by examiner

*Primary Examiner* — Robert D. Harlan
(74) *Attorney, Agent, or Firm* — Foley & Lardner LLP

(57) ABSTRACT

First pellets according to the present invention is characterized by satisfying all of the following requirements (Z), (1), (2), and (3): (Z) the pellet comprises a polymer (A) having an elastic modulus in tension of 100 MPa or less, (1) the pellets have an average weight per 30 pellets in the range of 0.80 to 2.00 g; (2) the pellets have a particle size distribution obtained by sieving in which pellets providing a maximum weight fraction account for 90 to 100% of the pellets; and (3) the pellets have a $L_{ave}/D_{ave}$ value in the range of 1.00 to 1.70. Second pellets according to the present invention is characterized by satisfying the requirements of the (Z) and the following (4): (4) the pellets have a blocking force of 35 N or less that is measured after the pellets are left under a load at 35° C. for 24 hours and further at −10° C. for 7 days.

7 Claims, 2 Drawing Sheets

PELLETS COMPRISING POLYMER AND PACKAGE CONTAINING THE SAME

TECHNICAL FIELD

The present invention relates to pellets containing a polymer (A) that has an elastic modulus in tension (initial elastic modulus as measured by a method in accordance with ASTM D-638-03) of 100 MPa or less. More specifically, the present invention relates to pellets excellent in blocking resistance, and containing a polymer (A) that has an elastic modulus in tension of 100 MPa or less.

BACKGROUND ART

Olefin copolymer rubber such as ethylene/propylene copolymer rubber or ethylene/propylene/diene copolymer rubber has become marketed in the form of pellets. However, since the olefin copolymer rubber has tackiness, there has been a problem of sticking together into blocks during storage even though the rubber is formed into pellets. Further, even in an ethylene/α-olefin copolymer elastomer that is relatively less sticky at normal temperature, the pellets thereof stick together into blocks when they are kept under a load or left in a high temperature atmosphere as in a summer season.

To overcome this difficulty, an attempt of improving the handling of the pellets has been made by applying powders such as talc and calcium stearate and a liquid such as silicone oil to flexible resin pellets (see Patent Document 1).

Patent Document 1: WO 2002/085979 pamphlet

DISCLOSURE OF INVENTION

Problems to be Solved by the Invention

However, even when the flexible resin pellets are applied with the powders and liquid, there has been room for improving the blocking resistance.

Further, when the pellets stored at relatively high temperatures are transported to a cold region and are processed into moldings, there is a problem of sticking together more heavily.

Therefore, an object of the present invention is to address the problems and to provide pellets that hardly stick together even when the pellets are stored and used in a cold region after the pellets are stored in the state of a package of pellets or the like at high temperatures under a load.

Means for Solving the Problems

The present inventors have made intensive studies, and as a result, have found that the problems can be addressed with pellets that have specific characteristics. The present invention is thus completed based on this finding.

Namely, first pellets according to the present invention is characterized by satisfying all of the following requirements (Z), (1), (2), and (3).

(Z) the pellet comprises a polymer (A) having an elastic modulus in tension (an initial elastic modulus as measured by a method in accordance with ASTM D-638-03) of 100 MPa or less.

(1) the pellets have an average weight per 30 pellets in the range of 0.80 to 2.00 g.

(2) the pellets have a particle size distribution obtained by sieving in which pellets providing a maximum weight fraction account for 90 to 100% of the pellets.

(3) the pellets have a $L_{ave}/D_{ave}$ value in the range of 1.00 to 1.70 wherein $L_{ave}$ and $D_{ave}$ are averages of the length L and the diameter D, respectively, of randomly selected 20 pellets and the length and the diameter are determined such that the length is larger than the diameter.

The polymer is preferably a polymer having a structural unit derived from an α-olefin.

The polymer having a structural unit derived from an α-olefin is preferably a copolymer having a structural unit derived from two or more kinds of α-olefins.

The copolymer having a structural unit derived from two or more kinds of α-olefins is preferably a copolymer (A-i) having a structural unit derived from ethylene and a structural unit derived from an α-olefin having three or more carbon atoms.

The copolymer having a structural unit derived from two or more kinds of α-olefins is preferably a copolymer (A-ii) having a structural unit derived from propylene and a structural unit derived from an α-olefin having two or more carbon atoms except for propylene.

The first pellets according to the present invention are preferably pellets in which powders and/or liquid adheres to the surface of the pellets.

A first package according to the present invention is characterized in that the pellets are packed in an amount of 15 to 1,500 kg in a container.

Second pellets according to the present invention is characterized by satisfying the following requirements (Z) and (4).

(Z) the pellet comprises a polymer (A) having an elastic modulus in tension (an initial elastic modulus as measured by a method in accordance with ASTM D-638-03) of 100 MPa or less.

(4) the pellets have a blocking force of 35 N or less as measured in a testing in which the blocking force is measured after the pellets are left under a load at 35° C. for 24 hours and further at −10° C. for 7 days.

The second pellets according to the present invention are preferably pellets in which powders and/or liquid adheres to the surface of the pellets.

A second package according to the present invention is characterized in that the second pellets are packed in an amount of 15 to 1,500 kg in a container.

Effect of the Invention

According to the present invention, pellets can be provided, in which the pellets hardly stick together when the pellets are stored in the state of a package at high temperatures under a load and then even when being stored and used in a cold region.

BEST MODE FOR CARRYING OUT THE INVENTION

Figure 1:
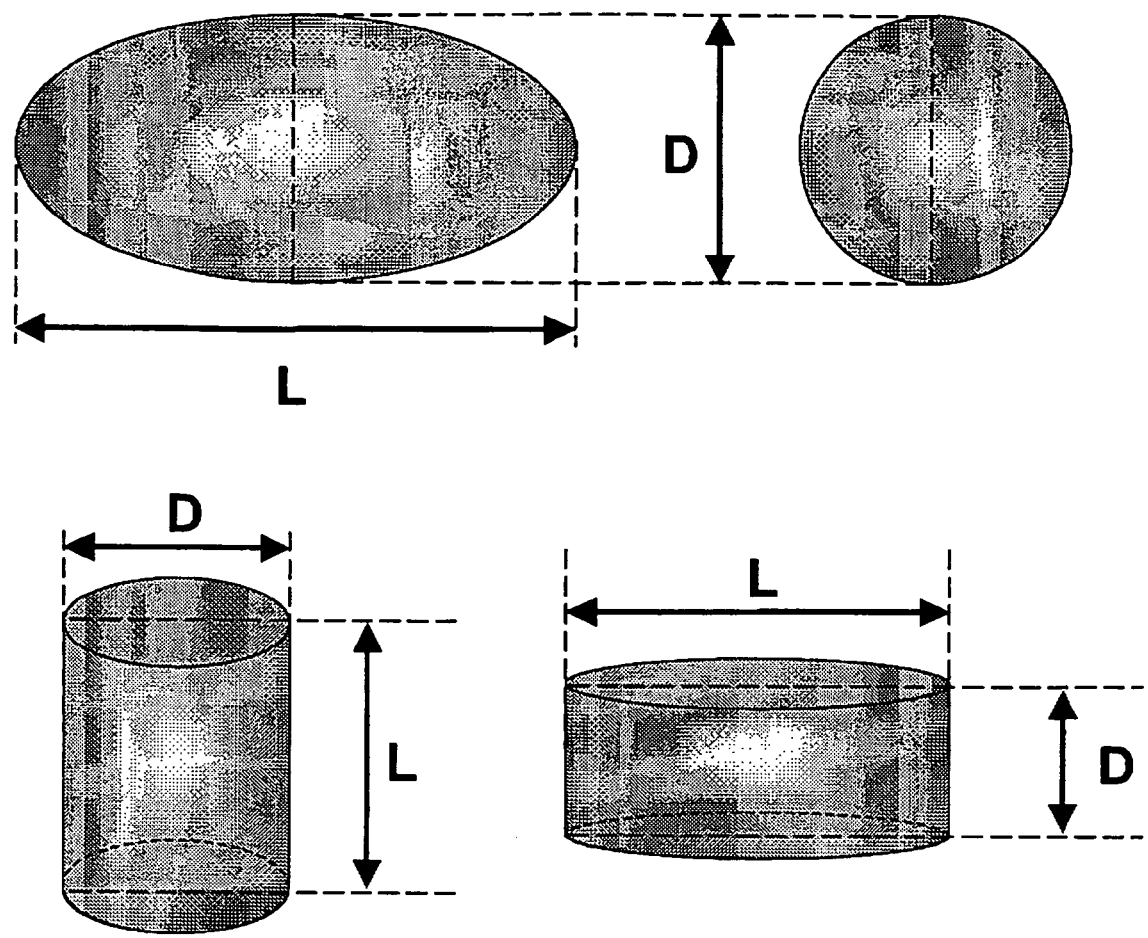
FIG. 1 illustrates measuring points of L and D of a pellet.

Hereinafter, the present invention will be described in detail.

<Polymer (A)>

The polymer (A) used in the first and second pellets according to the present invention has an elastic modulus in tension (YM: initial elastic modulus as measured by a method in accordance with ASTM D-638-03) of 100 mPa or less, preferably from 0.1 to 100 MPa, and more preferably from 0.1 MPa to 40 MPa. The elastic modulus in tension is preferred in the above range because the effect of the present invention exerts markedly. Further, the particularly preferred lower limit of the elastic modulus in tension is 1 MPa or more. A test piece for measuring the elastic modulus in tension is obtained by press-molding, and the molding temperature is selected in the range from the point at which the polymer fuses and starts to flow to 280° C.

Monomers used for the polymer are not particularly limited, for example, include an α-olefin having 2 to 20 carbon atoms, i.e., ethylene, and an arbitrary α-olefin. Suitable monomers include, for example, ethylene and an α-olefin having 3 or more, preferably 3 to 20, more preferably 3 to 12, and still more preferably 3 to 8 carbon atoms. Particularly suitable monomers include ethylene or at least one kind of α-olefins selected from propylene, butene-1,4-methyl-1-pentene, hexene-1, and octene-1. Further, the monomer may contain a conjugated polyene, a non-conjugated polyene, a cyclic olefin, and a polar-group containing vinyl monomer along with at least one kind of α-olefin. A polymer that contains a structural unit derived from at least one kind of α-olefins and optionally may contain a structural unit derived from any of the conjugated polyene, non-conjugated polyene, cyclic olefin, and polar-group containing vinyl monomer may be referred to as a polymer having a structural unit derived from α-olefins. Further, for example, a combination of an aromatic vinyl compound and a monomer selected from a conjugated polyene and a polar-group containing vinyl compound may be used.

The polymers (A) may include specifically, but are not limited to, a copolymer (A-i) having a structural unit derived from ethylene and a structural unit derived from an α-olefin having 3 to 20 carbon atoms, a copolymer (A-ii) having a structural unit derived from propylene and a structural unit derived from an α-olefin having 2 to 20 carbon atoms except for propylene, a copolymer (A-iii) having a structural unit derived from ethylene, a structural unit derived from an α-olefin having 3 to 20 carbon atoms, and a structural unit derived from a conjugated polyene and/or a non-conjugated polyene, a copolymer (A-iv) having a structural unit derived from ethylene and a structural unit derived from vinyl acetate, a copolymer rubber or hydrogenate thereof (A-v) having a structural unit derived from an aromatic vinyl compound and a structural unit derived from a conjugated diene, and the like. These polymers may be used alone or in a combination of two or more kinds as long as the polymer (A) as a whole satisfies the range of the elastic modulus in tension. As the polymer, a polymer containing a structural unit derived from an α-olefin is particularly preferred.

The polymers (A-i) to (A-v) listed above as examples will be explained below.

[Copolymer (A-i) Having a Structural Unit Derived from Ethylene and a Structural Unit Derived from an α-Olefin Having 3 to 20 Carbon Atoms]

The copolymer (A-i) having a structural unit derived from ethylene and a structural unit derived from an α-olefin having 3 to 20 carbon atoms used in the present invention (hereinafter, may be referred to as a copolymer (A-1)) is, for example, an ethylene/α-olefin copolymer (A-i-a) obtained by copolymerizing ethylene and an α-olefin having 3 to 20 carbon atoms, or a modified ethylene/α-olefin copolymer (A-i-b) in which an unsaturated carboxylic acid or a derivative thereof is grafted to an ethylene/α-olefin copolymer (for example, copolymer (A-i-a)), which has an elastic modulus in tension (YM: ASTM D-638-03) in the range described above.

Specific examples of the α-olefin having 3 to 20 carbon atoms copolymerized with ethylene may include propylene, 1-butene, 1-pentene, 1-hexene, 1-heptene, 1-octene, 1-nonene, 1-decene, 1-undecene, 1-dodecene, 1-hexadecene, 1-octadecene, 1-nonadecene, 1-eicosene, and 4-methyl-1-pentene and the like. These α-olefins may be used alone or in a combination of two or more kinds.

It is desirable that the ethylene/α-olefin copolymer (A-i-a) contains a structural unit derived from ethylene in an amount of 50 to 96 mol % and a structural unit derived from the α-olefin having 3 to 20 carbon atoms in an amount of 4 to 50 mol % (here, the total amount of the structural unit derived from ethylene and the structural unit derived from the α-olefin having 3 to 20 carbon atoms is 100 mol %).

The composition of the ethylene/α-olefin copolymer (A-i-a) is usually determined by measuring a $^{13}$C-NMR spectrum of a sample solution in which about 200 mg of the ethylene/α-olefin copolymer is uniformly dissolved in 1 ml of hexachlorobutadiene in a 10 mm diameter test tube, at a measuring temperature of 120° C., a measuring frequency of 25.05 MHz, a spectrum width of 1500 Hz, a pulse repetition time of 4.2 sec, and a pulse width of 6 μsec.

It is desirable that the ethylene/α-olefin copolymer (A-i-a) used in the present invention has a density (ASTM D 1505) of preferably 0.850 to 0.915 g/cm$^3$, more preferably 0.850 to 0.885 g/cm$^3$, and still more preferably 0.850 to 0.868 g/cm$^3$. When the density is in this range, the blocking prevention effect provided by the present invention is remarkable.

In addition, it is desirable that the ethylene/α-olefin copolymer (A-i-a) has a melt flow rate (MFR: ASTM D 1238, 190° C., 2.16 g of load) of 0.01 to 200 g/10 min and preferably 0.1 to 40 g/10 min.

Further, the melting point (Tm) of the ethylene/α-olefin copolymer (A-i-a) as measured with DSC (differential thermogravimetric analysis) is not particularly limited, but more preferably the melting point (Tm) as measured with DSC is 100° C. or lower or no melting point is observed; more preferably the melting point (Tm) is 70° C. or lower or no melting point is observed; and particularly preferably no melting point is observed. When the melting point (Tm) satisfies the above conditions, the blocking prevention effect provided by the present invention is remarkable. The temperature at the maximum peak position in an endothermic curve obtained by DSC is selected as the melting point (Tm). "No melting point is observed" means that no crystal melting peak having a crystal melting heat of 1 J/g or more is observed in the range of −150° C. to 200° C. Upon measurement, a test sample was loaded in an aluminum pan, and (1) the temperature was elevated at a rate of 10° C./min to 200° C. and kept at 200° C. for 5 minutes, (2) lowered at a rate of 20° C./min to −150° C., and then (3) elevated again at a rate of 10° C./min to 200° C. The endothermic curve was measured in the step of (3).

Specific examples of the ethylene/α-olefin copolymer (A-i-a) may include an ethylene/propylene random copolymer, an ethylene/1-butene random copolymer, an ethylene/propylene/1-butene random copolymer, an ethylene/1-hexene random copolymer, an ethylene/1-butene/1-hexene random copolymer, and an ethylene/1-octene random copolymer. These copolymers may be used in a combination of two or more kinds.

The ethylene/α-olefin copolymer (A-i-a) as described above may be produced by conventionally known methods using a vanadium catalyst, a titanium catalyst, a metallocene catalyst, or the like.

Further, the modified ethylene/α-olefin copolymer (A-i-b) is a polymer obtained by grafting an unsaturated carboxylic acid or a derivative thereof (hereinafter, referred to as unsaturated carboxylic acid or the like) to an ethylene/α-olefin copolymer (for example, the ethylene/α-olefin copolymer (A-i-a)), and satisfies the aforementioned elastic modulus in tension.

The grafted amount of the unsaturated carboxylic acid or the like in the modified ethylene/α-olefin copolymer is in the range of 0.01 to 30 wt %, preferably 0.01 to 10 wt %, and more preferably 0.1 to 2 wt % with respect to 100 wt % of the ethylene/α-olefin copolymer before grafted.

Specific examples of the unsaturated carboxylic acid may include acrylic acid, maleic acid, fumaric acid, tetrahydrophthalic acid, itaconic acid, citraconic acid, crotonic acid, isocrotonic acid, nadic Acid™ (endocisbicyclo[2,2,1]hept-5-ene-2,3-dicarboxylicacid) and the like.

Further, the unsaturated carboxylic acid derivatives may include a halide compound, an amide compound, an imides compound, an acid anhydride, and an ester compound of the unsaturated carboxylic acid, for example. Specifically, they may include maleyl chloride, maleimide, maleic anhydride, citraconic anhydride, monomethyl maleate, dimethyl maleate, glycidyl maleate and the like. Among these, unsaturated dicarboxylic acid or an anhydride thereof is preferred, particularly maleic acid and nadic Acid™ or an acid anhydride thereof are preferred.

Note that, the graft position of the unsaturated carboxylic acid or the like grafted to the ethylene/α-olefin copolymer (for example, ethylene/α-olefin copolymer (A-i-a)) is not particularly limited as long as the unsaturated carboxylic acid or the like is bonded to an arbitrary carbon atom of the ethylene/α-olefin copolymer.

The graft modification of the ethylene/α-olefin copolymer with unsaturated carboxylic acid or the like can be performed with conventionally known graft-polymerization methods. Examples of the methods may include a method in which graft-polymerization is performed by adding the unsaturated carboxylic acid or the like after the ethylene/α-olefin copolymer is fused and a method in which graft-polymerization is performed by adding unsaturated carboxylic acid or the like after the ethylene/α-olefin copolymer is dissolved in a solvent.

In these processes, when the graft-polymerization is performed in the presence of a radical initiator, a grafting monomer such as the unsaturated carboxylic acid or the like may be graft-polymerized efficiently. In this case, the radical initiator is used in an amount of usually 0.001 part to 2 parts by weight with respect to 100 parts by weight of the ethylene/α-olefin copolymer.

As the radical initiators, organic peroxides-, azo compounds, and the like are used. Specific examples of the radical initiators may include:

benzoyl peroxide, dichlorobenzoyl peroxide, dicumyl peroxide, di-t-butyl peroxide, 2,5-dimethyl-2,5-di(peroxide benzoate) hexine-3,1,4-bis(t-butylperoxyisopropyl) benzene, lauroyl peroxide, t-butyl peracetate, 2,5-dimethyl-2,5-di-(t-butylperoxide) hexine-3,2,5-dimethyl-2,5-di(t-butylperoxide) hexane, t-butyl perbenzoate, t-butyl perphenylacetate, t-butyl perisobutylate, t-butyl per-sec-octoate, t-butyl perpivarate, cumyl perpivarate, t-butyl perdiethylacetate, azobisisobutylonitrile, dimethylazoisobutylate and the like.

Among these, dialkyl peroxides such as dicumyl peroxide, di-t-butyl peroxide, 2,5-dimethyl-2,5-di(t-butylperoxy) hexine-3,2,5-dimethyl-2,5-di(t-butylperoxy) hexane, 1,4-bis(t-butylperoxyisopropyl) benzene and the like are preferably used.

The reaction temperature of graft-polymerization using the radical initiator as in the above or graft-polymerization without using a radical initiator is set in the range of usually 60 to 350° C. and preferably 150 to 300° C.

The elastic modulus in tension of the copolymer (A-i) is as in the polymer (A) described already, and is from 0.1 MPa to 40 Pa, preferably from 1 MPa to 40 MPa, in which a more marked effect is exerted.

[Copolymer (A-ii) Having a Structural Unit Derived from Propylene and a Structural Unit Derived from an α-Olefin Having 2 to 20 Carbon Atoms Except for Propylene]

The copolymer (A-ii) having a structural unit derived from propylene and a structural unit derived from an α-olefin having 2 to 20 carbon atoms except for propylene used in the present invention (hereinafter, may be referred to as a copolymer (A-ii)) is a propylene/α-olefin copolymer (A-ii-a) obtained by copolymerizing propylene and an α-olefin having 2 to 20 carbon atoms except for propylene, or a modified propylene/α-olefin copolymer (A-ii-b) in which an unsaturated carboxylic acid or a derivative thereof is grafted to a propylene/α-olefin copolymer (for example, copolymer (A-ii-a)), which has an elastic modulus in tension (YM: ASTM D-638) in the range described above.

Specific examples of the α-olefin having 2 to 20 carbon atoms except for propylene copolymerized with propylene may include ethylene, 1-butene, 1-pentene, 1-hexene, 1-heptene, 1-octene, 1-nonene, 1-decene, 1-undecene, 1-dodecene, 1-hexadecene, 1-octadecene, 1-nonadecene, 1-eicosene, 4-methyl-1-pentene and the like. These α-olefins may be used alone or in a combination of two or more kinds.

It is desirable that the propylene/α-olefin copolymer (A-ii-a) contains a structural unit derived from propylene in an amount of 50 to 95 mol % and a structural unit derived from the x-olefin having 2 to 20 carbon atoms except for propylene in an amount of 5 to 50 mol % (here, the total amount of the structural unit derived from propylene and the structural unit derived from the α-olefin having 2 to 20 carbon atoms except for propylene is 100 mol %).

The composition of the propylene/α-olefin copolymer (A-ii-a) is usually determined by measuring a $^{13}$C-NMR spectrum of a sample solution in which about 200 mg of the propylene/α-olefin copolymer is uniformly dissolved in 1 ml of hexachlorobutadiene in a 10 mm diameter test tube, at a measuring temperature of 120° C., a measuring frequency of 25.05 MHz, a spectrum width of 1500 Hz, a pulse repetition time of 4.2 sec, and a pulse width of 6 μsec.

It is desirable that the propylene/α-olefin copolymer (A-ii-a) used in the present invention has a density (ASTM D 1505) of preferably 0.850 to 0.905 g/cm$^3$, and more preferably 0.850 to 0.885 g/cm$^3$. Further, it is desirable that the propylene/α-olefin copolymer (A-ii-a) has a melt flow rate (MFR: ASTM D 1238, 230° C., 2.16 g of load) of preferably 0.01 to 400 g/10 min, more preferably 0.01 to 200 g/10 min, and still more preferably 0.1 to 70 g/10 min.

In addition, the melting point (Tm) of the propylene/α-olefin copolymer (A-ii-a) as measured with DSC (differential thermogravimetric analysis) is not particularly limited, but more preferably the melting point (Tm) as measured with DSC is 100° C. or lower or no melting point is observed; more preferably the melting point (Tm) is 70° C. or lower or no melting point is observed; and particularly preferably no melting point is observed. When the melting point (Tm) satisfies the above conditions, the blocking prevention effect provided by the present invention is remarkable. The temperature at the maximum peak position in an endothermic curve obtained by DSC is selected as the melting point (Tm). The definition of "no melting point is observed" and the method for measuring the endothermic curve of DSC are the same as those of the ethylene/α-olefin copolymer (A-i-a).

Further, the stereoregularity of the polypropylene may be any of syndiotactic, isotactic, and atactic.

Specific examples of the propylene/α-olefin copolymer (A-ii-a) may include a propylene/ethylene copolymer, a propylene/1-butene copolymer, a propylene/ethylene/1-butene copolymer, a propylene/ethylene/1-octene copolymer and the like. These copolymers may be used in a combination of two or more kinds.

The propylene/α-olefin copolymer (A-ii-a) as described above may be produced by conventionally known methods using a vanadium catalyst, a titanium catalyst, a metallocene catalyst, or the like.

Further, the modified propylene/α-olefin copolymer (A-ii-b) is a polymer obtained by grafting an unsaturated carboxylic acid or a derivative thereof (hereinafter, referred to as unsaturated carboxylic acid or the like) to a propylene/α-olefin copolymer (for example, the propylene/α-olefin copolymer (A-ii-a)).

The unsaturated carboxylic acid or the like used for the production of the modified propylene/α-olefin copolymer (A-ii-b) are the same compounds as that used for the production of the modified ethylene/α-olefin copolymer (A-i-b).

The grafted amount of the unsaturated carboxylic acid or the like in the modified propylene/α-olefin copolymer (A-ii-b) is in the range of 0.01 to 30 wt %, preferably 0.01 to 10 wt %, and more preferably 0.1 to 2 wt % with respect to 100 wt % of the propylene/α-olefin copolymer before grafted.

Note that, the graft position of the unsaturated carboxylic acid or the like grafted to the propylene/α-olefin copolymer is not particularly limited as long as the unsaturated carboxylic acid or the like is bonded to an arbitrary carbon atom of the propylene/α-olefin copolymer.

The graft modification of the propylene/α-olefin copolymer with unsaturated carboxylic acid or the like can be performed in a manner similarly to the production method of the (A-i-b).

The elastic modulus in tension of the copolymer (A-ii) is as in the polymer (A) described already, and is preferably 0.1 to 40 MPa, more preferably 0.1 to 20 MPa, particularly preferably 0.1 to 10 Pa, and particularly preferably 1 to 10 MPa, in which a more marked effect of the present invention is exerted.

[Copolymer (A-iii) Having a Structural Unit Derived from Ethylene, a Structural Unit Derived from an α-Olefin Having 3 to 20 Carbon Atoms, and a Structural Unit Derived from a Conjugated Polyene and/or a Non-Conjugated Polyene]

The copolymer (A-iii) having a structural unit derived from ethylene, a structural unit derived from an α-olefin having 3 to 20 carbon atoms, and a structural unit derived from a conjugated polyene and/or a non-conjugated polyene used in the present invention (hereinafter, may be referred to as a copolymer (A-iii)) is a copolymer (A-iii-a) obtained by randomly copolymerizing ethylene, an α-olefin having 3 to 20 carbon atoms, and a conjugated diene monomer and/or a non-conjugated polyene monomer, or a copolymer (A-iii-b) (hereinafter, may be referred to as a modified copolymer (A-iii-b)) in which an unsaturated carboxylic acid or a derivative thereof is grafted to a copolymer (for example, the copolymer (A-iii-a)) obtained by randomly copolymerizing ethylene, an α-olefin having 3 to 20 carbon atoms, and a conjugated diene monomer and/or a non-conjugated polyene monomer, which has an elastic modulus in tension (YM: ASTM D-638) in the range described above.

The α-olefins include, but not limited to, those having 3 to 20 carbon atoms, and may be straight-chain or branched.

Specific examples of the α-olefin may include propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-heptene, 1-octene, 1-nonene, 1-decene, 1-undecene, 1-dodecene, 1-tetradecene, 1-pentadecene, 1-hexadecen, 1-heptadecene, 1-octadecene, 1-nonadecene, 1-eicosene, 9-methyl-1-decene, 11-methyl-1-dodecene, 12-ethyl-1-tetradecene and the like. Among these, propylene, 1-butene, 1-hexene, 1-octene, and 1-decene are preferably used.

These α-olefins may be used alone or in a combination of two or more kinds.

The conjugated diene monomer is represented by the following formula.

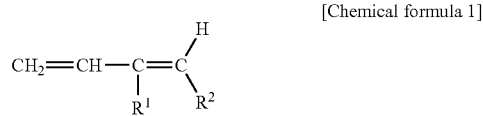

[Chemical formula 1]

In the formula, $R^1$ and $R^2$, each is independently a hydrogen atom, an alkyl or aryl group having 1 to 8 carbon atoms; and at least one of $R^1$ and $R^2$ is a hydrogen atom.

Specific examples of the conjugated diene may include 1,3-butadiene, 1,3-pentadiene, 1,3-hexadiene, 1,3-heptadiene, 1,3-octadiene, 1-phenyl-1,3-butadiene, 1-phenyl-2,4-pentadiene, isoprene, 2-ethyl-1,3-butadiene, 2-propyl-1,3-butadiene, 2-butyl-1,3-butadiene, 2-pentyl-1,3-butadiene, 2-hexyl-1,3-butadiene, 2-heptyl-1,3-butadiene, 2-octyl-1,3-butadiene, 2-phenyl-1,3-butadiene and the like. Among these, 1,3-butadiene and isoprene are particularly preferable because they are excellent in copolymerization performance. These conjugated diene monomers may be used alone or in a combination of two or more kinds.

Further, specific examples of the non-conjugated polyene monomer may include dicyclopentadiene, 1,4-hexadiene, cyclo-octadiene, methylene norbornene, ethylidene norbornene, 4,8-dimethyl-1,4,8-decatriene, 4,8-dimethyl-1,4,9-decatriene, 4,9-dimethyl-1,4,9-decatriene, 5,8-dimethyl-1,4,9-decatriene, 5,9-dimethyl-1,4,9-decatriene, 5-vinyl-1,6-octadiene and the like. A preferred non-conjugated polyene monomer is an aliphatic polyene compound.

In the copolymer (A-iii-a), the structural unit derived from ethylene, the structural unit derived from an α-olefin having 3 to 20 carbon atoms, and the structural unit derived from (non)conjugated polyene monomers are randomly sequenced and bonded together. The polymer has a double bond structure originated from the (non)conjugated polyene monomers, having a main chain with a substantially linear structure.

The copolymer (A-iii-a) can be confirmed to have a substantially linear structure and have substantially no gel-form cross-linked polymers by the fact that the copolymer dissolves in an organic solvent and contains substantially no insolubles, for example, by the fact that the copolymer completely dissolves in decalin at 135° C. when a limiting viscosity of η is measured.

In the copolymer (A-iii-a) used in the present invention, the molar ratio (ethylene/α-olefin) of the structural unit derived from ethylene to the structural unit derived from an α-olefin having 3 to 20 carbon atoms is in the range of preferably 99/1 to 40/60, more preferably 95/5 to 50/50, and still more preferably 90/10 to 55/45. In addition, when the total of the structural unit derived from ethylene, the structural unit derived from the α-olefin, and the structural unit derived from a conjugated diene and/or a non-conjugated polyene is 100 mol %, the total of the structural units derived from the conjugated diene and non-conjugated polyene is preferably 0.1 to 30 mol % and more preferably 0.2 to 20 mol %.

It is desirable that the copolymer (A-iii-a) used in the present invention has a density (ASTM D 1505) of preferably 0.855 to 0.880 g/cm$^3$ and more preferably 0.855 to 0.875 g/cm$^3$, and a Mooney viscosity (ML$_{1+4}$(100° C.)) in the range of preferably 1 to 150 and more preferably 5 to 130.

It is desirable that the copolymer (A-iii-a) has a limiting viscosity of η as measured in decalin at 135° C. of usually in the range of 0.1 to 10 dl/g and preferably 1.0 to 7.0 dl/g. The limiting viscosity of η is a measure for the molecular weight of an unsaturated olefin polymer (iii).

In addition, the melting point (Tm) of the copolymer (A-iii-a) as measured with DSC (differential thermogravimetric analysis) is not particularly limited, but more preferably the melting point (Tm) as measured with DSC is 100° C. or lower or no melting point is observed; more preferably the melting point (Tm) is 70° C. or lower or no melting point is observed; and particularly preferably no melting point is observed. When the melting point (Tm) satisfies the above conditions, the blocking prevention effect provided by the present invention is remarkable. The temperature at the maximum peak position in an endothermic curve obtained by DSC is selected as the melting point (Tm). The definition of "no melting point is observed" and the method for measuring the endothermic curve of DSC are the same as those of the ethylene/α-olefin copolymer (A-i-a).

Further, the stereoregularity of polypropylene may be any of syndiotactic, isotactic, and atactic.

It is also desirable that the copolymer (A-iii-a) has an iodine value of usually 1 to 50, preferably 3 to 50, and more preferably 5 to 40.

In the present invention, preferably at least one among the molar ratio of each structural unit, the limiting viscosity of η, and the iodine value is in the above ranges, more preferably two or more of these are in the above ranges, and particularly preferably all of them are in the above ranges.

Further, the Mw/Mn value as measured by GPC is preferably 3 or less.

The Mw/Mn of the copolymer (A-iii-a) was measured by GPC (gel permeation chromatography) in a solvent of ortho-dichlorobenzene at 140° C.

The copolymer (A-iii-a) used in the present invention may be a so-called oil-extended rubber, that is, a rubber extended with a softener such as a conventionally known mineral oil type softener and the like.

Specific examples of the copolymer (A-iii-a) used in the present invention may include an EPDM such as an ethylene/propylene/1,3-butadiene copolymer, an ethylene/propylene/isoprene copolymer, an ethylene/propylene/5-ethylidene-2-norbornene copolymer rubber and the like, and an oil-extended EPDM such as an oil-extended ethylene/propylene/1,3-butadiene copolymer, an oil-extended ethylene/propylene/isoprene copolymer, an oil-extended ethylene/propylene/5-ethylidene-2-norbornene copolymer rubber and the like.

The copolymer (A-iii-a) as described above is obtained by copolymerizing, preferably randomly copolymerizing ethylene, an α-olefin having 3 to 20 carbon atoms, and a conjugated diene monomer and/or non-conjugated polyene represented by the formula mentioned above in the presence of a conventionally known vanadium or metallocene catalyst.

The details about the production method of the copolymer (A-iii-a) used in the present invention and the metallocene catalyst used in the production method are described in Japanese Patent Laid-Open Publication No. H11-228743.

In addition, the modified copolymer (A-iii-b) is a polymer in which an unsaturated carboxylic acid or a derivative thereof (hereinafter, referred to as unsaturated carboxylic acid or the like) is grafted to a copolymer (for example, the copolymer (A-iii-a)) obtained by randomly copolymerizing ethylene, an α-olefin having 3 to 20 carbon atoms, and a conjugated diene monomer and/or a non-conjugated polyene monomer.

The unsaturated carboxylic acid or the like used for the production of the modified copolymer (A-iii-b) are the same compounds as that used for the production of the modified ethylene/α-olefin copolymer (A-i-b).

The grafted amount of the unsaturated carboxylic acid or the like in the modified copolymer (A-iii-b) is in the range of 0.01 to 30 wt %, preferably 0.01 to 10 wt %, and more preferably 0.1 to 2 wt % with respect to 100 wt % of the unsaturated olefin copolymer (iii-a) before grafted.

Note that, the graft position of the unsaturated carboxylic acid or the like grafted to the copolymer obtained by randomly copolymerizing ethylene, an α-olefin having 3 to 20 carbon atoms, and a conjugated diene monomer and/or a non-conjugated polyene monomer is not particularly limited as long as the unsaturated carboxylic acid or the like is bonded to an arbitrary carbon atom of the copolymer obtained by randomly copolymerizing ethylene, an α-olefin having 3 to 20 carbon atoms, and a conjugated diene monomer and/or a non-conjugated polyene monomer.

The graft modification with the unsaturated carboxylic acid or the like can be performed in a manner similarly to the production method of the (i-b).

The elastic modulus in tension of the copolymer (A-iii) is as in the polymer (A) described already, but is more preferably 0.1 to 40 MPa and still more preferably 1 to 40 MPa, in which a more marked effect is exerted.

[Copolymer (A-iv) Having a Structural Unit Derived from Ethylene and a Structural Unit Derived from Vinyl Acetate]

The copolymer (A-iv) having a structural unit derived from ethylene and a structural unit derived from vinyl acetate used in the present invention (hereinafter, may be referred to as a copolymer (A-iv)) is an ethylene/vinyl acetate copolymer (A-iv-a) obtained by copolymerizing ethylene and vinyl acetate, or a modified ethylene/vinyl acetate copolymer (A-iv-b) in which an unsaturated carboxylic acid or a derivative thereof is grafted to an ethylene/vinyl acetate copolymer (for example, copolymer (A-iv-a)), which has an elastic modulus in tension (YM: initial elastic modulus as measured by a method in accordance with ASTM D-638-03) in the range described above.

It is desirable that the ethylene/vinyl acetate copolymer (A-iv-a) used in the present invention has a vinyl acetate content of preferably 5 to 40 wt % and more preferably 10 to 35 wt %.

In addition, the melting point (Tm) of the ethylene/vinyl acetate copolymer (A-iv-a) as measured with DSC is preferably 100° C. or lower or no melting point is observed and more preferably 63° C. or lower or no melting point is observed. When the melting point (Tm) satisfies the above conditions, the blocking prevention effect provided by the present invention is remarkable. The temperature at the maximum peak position in an endothermic curve obtained by DSC is selected as the melting point (Tm). The definition of "no melting point is observed" and the method for measuring the endothermic curve of DSC are the same as those of the (A-i-a).

Further, this ethylene/vinyl acetate copolymer (A-iv-a) generally has a melt flow rate (ASTM D 1238, 190° C., 2.16 kg of load) of usually 0.1 to 50 g/10 min and preferably 0.3 to 30 g/10 min.

Furthermore, the modified ethylene/vinyl acetate copolymer (A-iv-b) is a polymer in which an unsaturated carboxylic acid or a derivative thereof (hereinafter, referred to as unsaturated carboxylic acid or the like) is grafted to an ethylene/vinyl acetate copolymer (for example, the ethylene/vinyl acetate copolymer (A-iv-a)).

The unsaturated carboxylic acid or the like used for the production of the modified ethylene/vinyl acetate copolymer (A-iv-b) are the same compounds as that used for the production of the modified ethylene/α-olefin copolymer (A-i-b).

The grafted amount of the unsaturated carboxylic acid or the like in the modified copolymer (A-iv-b) is in the range of 0.01 to 30 wt %, preferably 0.01 to 10 wt %, and more preferably 0.1 to 2 wt % with respect to 100 wt % of the ethylene/vinyl acetate copolymer (for example, the ethylene/vinyl acetate copolymer (A-iv-a)) before grafted.

Note that, the graft position of the unsaturated carboxylic acid or the like grafted to the ethylene/vinyl acetate copolymer is not particularly limited as long as the unsaturated carboxylic acid or the like is bonded to an arbitrary carbon atom of the ethylene/vinyl acetate copolymer.

The graft modification of the ethylene/vinyl acetate copolymer with the unsaturated carboxylic acid or the like can be performed in a manner similarly to the production method of the (A-i-b).

The elastic modulus in tension of the copolymer (A-iv) is as in the polymer (A) described already, but is preferably 0.1 to 40 MPa, more preferably 0.1 to 20 MPa, and still more preferably 0.1 to 10 MPa, especially preferably 1 and 10 MPa, in which a more marked effect is exerted when the elastic modulus in tension is in the above range.

[Copolymer Rubber (A-v) Having a Structural Unit Derived from an Aromatic Vinyl Compound and a Structural Unit Derived from a Conjugated Diene (Provided that Part or all of the Structural Units May be Hydrogenated)]

The copolymer rubber (A-v) having a structural unit derived from an aromatic vinyl compound and a structural unit derived from a conjugated diene (provided that part or all of the structural units may be hydrogenated) (hereinafter, may be referred to as a copolymer rubber (A-v)) is an aromatic vinyl compound/conjugated diene copolymer or a hydrogenate thereof such as a hydrogenated diene polymer composed of a block segment of an aromatic vinyl compound (including styrene, for example, and the same holds in the following description)/butadiene copolymer, a hydrogenated diene polymer composed of a block segment of polyisoprene and a block segment of an aromatic vinyl compound/isoprene copolymer, a block copolymer composed of a polymer block mainly composed of an aromatic vinyl compound and a polymer block mainly composed of a conjugated diene compound, a hydrogenate of a block copolymer composed of a polymer block mainly composed of an aromatic vinyl compound and a polymer block mainly composed of a conjugated diene compound, a hydrogenate of a random copolymer of an aromatic vinyl compound and a conjugated diene compound (hereinafter, they may collectively be called as a copolymer (A-v-a)), and the like, or a modified aromatic vinyl compound/conjugated diene copolymer rubber and a hydrogenate thereof (A-v-b) (hereinafter, may be referred to as a modified copolymer (A-v-b)) in which an unsaturated carboxylic acid or a derivative thereof is grafted to a copolymer having the structural units as in described above (for example, the copolymer (A-v-a)), and the like, which is publicly known and has an elastic modulus in tension (YM: initial elastic modulus as measured by a method in accordance with ASTM D-638-03) in the range described above. These copolymers (A-v) may be used alone or in a combination of two or more kinds.

In addition, it is desirable that the copolymer rubber (A-v) having a structural unit derived from an aromatic vinyl compound and a structural unit derived from a conjugated diene (provided that part or all of the structural units may be hydrogenated) has a Vicat softening temperature (ASTM D1525) of 110° C. or lower and more preferably 63° C. or lower, or no Vicat softening temperature is observed.

It is desirable that the aromatic vinyl compound/conjugated diene copolymer rubber and a hydrogenate thereof (A-v-a) (the copolymer A-v-a) used in the present invention has an aromatic vinyl compound (styrene, for example) content of preferably 5 to 80 wt % and more preferably 10 to 50 wt %. Further, the copolymer (A-v-a) generally has a melt flow rate (ASTM D1238, 230° C., 2.16 kg of load) of usually 0.1 to 200 g/10 min and preferably 0.5 to 70 g/10 min.

Furthermore, the modified aromatic vinyl compound/conjugated diene copolymer rubber and a hydrogenate thereof (A-v-b) is a polymer in which an unsaturated carboxylic acid or a derivative thereof (hereinafter, referred to as unsaturated carboxylic acid or the like) is grafted to an aromatic vinyl compound/conjugated diene copolymer rubber and a hydrogenate thereof (for example, the copolymer (A-v-a)).

The unsaturated carboxylic acid or the like used for the production of the aromatic vinyl compound/conjugated diene copolymer rubber and a hydrogenate thereof (A-v-b) are the same compounds as that the unsaturated carboxylic acid or the like used for the production of the modified ethylene/α-olefin copolymer (A-i-b). The (A-v-b) can be produced by the same method as the production method of the (A-i-b).

The elastic modulus in tension of the copolymer (A-v) is as in the polymer (A) described already, but is preferably 0.1 to 40 MPa, more preferably 0.1 to 20 MPa, still more preferably 0.1 to 10 MPa, and especially preferably 1 to 10 MPa, in which a more marked effect is exerted when the elastic modulus in tension is in the above range.

Among these polymers of (A-i) to (A-v), a copolymer having a structural unit derived from two or more kinds of α-olefins having 2 to 20 carbon atoms is preferable because a blocking effect obtained by the present invention is marked. Specifically, the copolymers (A-i) and (A-ii) are particularly suitably used, and the copolymer (A-i) is particularly preferable.

The polymer contained in the pellets of the present invention may be only the polymer (A) having an elastic modulus in tension (initial elastic modulus as measured by the method in accordance with ASTM-D-638-03) of 100 MPa or less as described above. The polymer may also be a composition in which a thermoplastic resin having a larger value of elastic modulus in tension (initial elastic modulus as measured by the method in accordance with ASTM-D-638-03) than the value required for the polymer (A), a thermoplastic resin (x) having an elastic modulus in tension of preferably 100 MPa or more and more preferably 150 to 1700 MPa is blended in an amount of 35 wt % or less, preferably 30 wt % or less, and more preferably 20 wt % or less with respect to 100 wt % of the total amount of (A)+(x) contained in the pellets.

The (x) is not particularly limited, but may include preferably polyolefin. The polyolefins may include a polymer or copolymer of an α-olefin having 2 to 20 carbon atoms, and preferably an ethylene homopolymer, a copolymer of ethylene and an α-olefin having 3 to 20 carbon atoms, and a copolymer of propylene and an α-olefin having 2 to 20 carbon atoms except for propylene. In this case, the melting point of the (x) as measured with DSC is not particularly limited, but the melting point is 80° C. or higher, preferably 81 to 180° C., and more preferably 121 to 170° C. The melting point can be measured similarly to the measurement of the melting point of the (A) component.

Further, to the pellets, other than the polymer (A) and the thermoplastic resin (x) that is an optional component, if necessary, additives usually used such as a nucleating additive, a clarifying agent, a heat stabilizer, a ultraviolet light stabilizer, a weather stabilizer, a foaming agent, an anti-clouding agent, a corrosion inhibitor, an ion trapping agent, a fire retardant, a fire retarding auxiliary agent, an inorganic filler, an organic pigment, an inorganic pigment and the like may be added in an usual amount. The amount added is not particularly limited, but 10 parts by weight or less, preferably 5 parts by weight or less, and particularly preferably 1 part by weight or less with respect to 100 parts by weight of the total amount of the polymer (A) and the thermoplastic resin (x) that is an optional component, for example. The lower limit of the amount of the additives used is not particularly specified, but 0.0001 part by weight or more, for example.

Furthermore, with the pellets in which the polymer (A) is contained and optionally the thermoplastic resin (x) and additives may be contained, the elastic modulus in tension of YM (initial elastic modulus as measured by the method in accordance with ASTM-D-638-03) is preferably 100 MPa or less, more preferably 0.1 to 100 MPa, still more preferably 0.1 to 40 MPa, particularly preferably 0.1 to 20 MPa, and especially preferably 0.1 to 10 MPa, when the pellets are press-molded while no powders and liquid adheres to the pellets. The lower limit of the elastic modulus in tension is particularly preferably 1 MPa or more.

<First Pellets>

The first pellets according to the present invention are pellets comprising the polymer described above, and is characterized by further satisfying the following requirements (1) to (3). Namely, the first pellets are pellets comprising the polymer (A) that has an elastic modulus intension (initial elastic modulus as measured by the method in accordance with ASTM D-638-03) of 100 MPa or less, and is characterized by further satisfying the following requirements (1) to (3). The pellets may mean a collective of pellets. The amount of the pellets belonging to the collective is not particularly limited, but is more than the amount that allows a blocking test described later to be performed, that is, 95 g or more, for example. The upper limit is not particularly specified. As described later, as a matter of practical convenience, the pellets to belong to the collective may be portioned by 1500 kg or less each for the sake of convenience of packaging or the like, for example.

(1) The pellets have an average weight per 30 pellets in the range of 0.80 to 2.00 g, preferably 0.90 to 1.80 g, more preferably 0.95 to 1.80 g, and still more preferably 1.00 to 1.80 g. That is, the average value of the total weight of 30 pellets selected at random from the collective of pellets is in the above range.

When the average weight of 30 pellets is in the above range, an excellent blocking resistance is exerted especially at low temperatures.

In practice, the averaged 30 pellet weight is determined as follows. The total weight of 30 pellets selected at random from the collective of pellets is measured with an electronic balance having an accuracy of 4 digits or more to the right of the decimal point. This operation of sampling randomly 30 pellets and measuring the total weight of the pellets is repeated 3 times in total, and then an average value of the resulting 3 values measured is calculated. Here, the average value is rounded off to two decimal places. Note that, this measurement is carried out after the collective of pellets is washed by a process described in the Examples and the pellets are selected at random from the collective.

(2) The pellets have a particle size distribution obtained by sieving in which pellets providing a maximum weight fraction account for 90 to 100% and preferably 97 to 100% of the pellets.

This proportion of the pellets providing a maximum weight fraction ensures excellent blocking resistance, in particular at low temperatures.

In practice, the proportion of the pellets providing a maximum weight fraction is determined by the following sieving method. Standard sieves with an inside diameter of 200 mm and a depth of 45 mm in accordance with JIS Z8801, to which sieves with apertures of 11.2 mm, 9.5 mm, 8.00 mm, 6.70 mm, 5.60 mm, 4.75 mm, 4.00 mm, 3.35 mm, 2.80 mm, 2.36 mm, 2.00 mm, and 1.70 mm respectively, are mounted, from the top in this order, on a fully automatic Ro-Tap sieving analyzer of "GRADEX2000". After that, 50 g of pellets selected at random from the collective of pellets are put on the sieve with an aperture of 11.2 mm mounted on the top. An operation of rotating the sieves in left for 30 seconds, then in right for 30 seconds is repeated for 10 minutes in total. "Rotating the sieves" means that all of the sieves arranged vertically and mounted are made to rotate horizontally in unison in order to carry out the screening. When rotating, the rotation radius is 3 cm and the rotation speed is 60 rpm. Then, the weight of the pellets sieved on each sieve is measured and the proportion of the pellets on each sieve is represented in percentage terms. Of the percentages, the highest percentage represents the proportion of the pellets providing a maximum weight fraction. Note that, the present measurement is performed after the collective of pellets is washed and the pellets are selected at random from the collective according to a method described in Examples. Further, when the pellets to be measured are found in blocks by visual inspection, the blocked pellets are freed up by hand in advance, and after the confirmation that the blocked pellets are not observed by visual inspection, the pellets are put on the sieve with an aperture of 11.2 mm mounted on the top, and then the sieving operation is started.

(3) The pellets have a $L_{ave}/D_{ave}$ value in the range of 1.00 to 1.70 and preferably from 1.0 to 1.5 wherein $L_{ave}$ and $D_{ave}$ are averages of the length L and the diameter D, respectively, of randomly selected 20 pellets and the length and the diameter are determined such that the length is larger than the diameter. Note that, this measurement is carried out after the collective of pellets is washed and the pellets are selected at random from the collective according to a method described in Examples.

When the $L_{ave}/D_{ave}$ is in the above range, an excellent blocking resistance is exerted at low temperatures.

In practice, the $L_{ave}/D_{ave}$ is obtained as follows.

From a collective of pellets, 20 pellets are selected at random. One pellet is lightly grasped with a pair of tweezers, and the length and diameter of the pellet are measured down to 0.05 mm with a first-class caliper in accordance with JIS B 7507 while keeping the pellet not deformed. The measured value is rounded off to one decimal place.

For example, a pellet is subjected to visual inspection, and when the pellet is found to be in an ellipsoidal sphere as shown in the upper column of FIG. 1 or is recognized to be in a form close to the ellipsoidal sphere, the pellet is assumed to be an ellipsoidal sphere and is measured as follows.

(1) In the direction of arrow (major axis direction of the ellipsoidal sphere) denoted by L in the figure, a measurement point is selected in a manner that the point provides the largest size, and the size given by the point is referred to as "length".

(2) In a cross-section perpendicularly to the direction (major axis direction of the ellipsoidal sphere) in the figure, a measurement point is selected in a manner that the point provides the largest size (diameter), and the size given by the point is referred to as "diameter" that is in accordance with the present invention. Note that, in (2) when determining the "diameter" in accordance with the present invention, considering that the measured value of the size could be varied if the measurements point is deviated in the major axis direction or in the cross-section, a portion providing the largest size should be located.

The value measured in (1) is referred to as L, and the value measured in (2) is selected as D.

In addition, a pellet is subjected to visual inspection, and when the pellet is found to be in a cylindrical form as shown in the lower column of FIG. 1 or is recognized to be in a form close to the cylindrical form, the pellet is assumed to be a cylinder and is measured as follows. Note that, when determining the pellet as cylinder or not, one of criteria for the determination is whether the pellet has a portion regarded as a bottom face of a cylinder or not.

(1) In a height direction as shown in the figure, a measurement point is selected in a manner that the size provides the largest size, and the size given by the point is referred to as "length".

(2) In a cross-section perpendicular to the height direction as shown in the figure, a measurement point is selected in a manner that the point provides the largest size (diameter), and the size given by the point is referred to as "diameter". Note that, in (2) when determining the "diameter" in accordance with the present invention, considering that the measured value of the size could be varied if the measurements point is deviated in the height direction or in the cross-section, a portion providing the largest size should be located.

Between the values measured in (1) and (2), the larger one is referred to as L of the pellet, and the smaller one is referred to as D of the pellet.

In the lower column of FIG. 1, for typical two cases that are recognized to be a cylinder, the measurement point of L and D is shown.

Further, when the pellet is not recognized to be an ellipsoidal sphere nor a cylinder, two points are selected on the surface of a pellet in a manner that the direct distance between these two points provides the longest distance, and the direct distance is referred to as the length of the pellet. In the cross-section perpendicular to the direction of the length, a portion that provides the largest size is located, and the size of the portion is measured, which is referred to as the diameter of the pellet. In this case also, when determining the diameter, considering that the measured value of the size could be varied if the measurements point is deviated in the major axis direction or in the cross-section, a portion providing the largest size should be located.

In this case, the length is referred to as L and the diameter is referred to as D.

As the pellets, pellets produced by extruding through a round hole of a die are preferred.

In this way, L and D are measured for all of 20 pellets, and $L_{ave}$ that is an average value of L and $D_{ave}$ that is an average value of D are determined respectively. Subsequently, the ratio of $L_{ave}/D_{ave}$ is calculated.

The pellets that satisfy the requirements (1) to (3) are not easily stuck together when storing and using the pellets in a cold region after storing in a state of package or the like at high temperatures and under a load, and are excellent in blocking resistance.

In addition, the $D_{ave}$ of the collective of pellets is preferably 3.0 mm or more, more preferably 3.1 to 10 mm, and particularly preferably 3.3 to 6.0 mm. Within this range, still more excellent blocking resistance can be exerted.

The $L_{ave}$ of the collective of pellets is preferably 3.1 to 11 mm, more preferably 3.3 to 7.0 mm, and particularly preferably 3.3 to 6.0 mm. Note that, $L_{ave} \geq D_{ave}$ by definition.

The first pellets having the properties described above are produced as in the following: the polymer in a melt state is extruded through a hole that is formed in a die arranged at the top of an extruder; and then, the extruded polymer is cut by rotating cutter blades placed on the foreside of the die. Further, in order to obtain the pellets having the properties, the underwater cutting process is desirably employed.

The requirement (1) described above may be conditioned by changing the flow rate of the polymer in the die hole, which is determined mainly by the diameter of the die hole, the number of holes of the die, and the extruder rate, and the circumferential velocity of the cutter, which is determined by the revolutions of cutter. Alternatively, the requirement may be conditioned by changing the number of cuter blades placed on the foreside of the die.

The diameter of the die hole is preferably 3 to 5 mm and more preferably 3 to 3.5 mm. Adequate diameter and the number of holes of the die are set in a manner that the flow rate of the polymer in the die hole becomes 0.4 m/sec or lower when the targeted extruder rate is attained. Further, the number of cutter blades and the revolutions of cutter are set at the values respectively that are calculated from the diameter and number of die holes in a manner that the average weight of 30 pellets is adjusted in the range described above when the circumferential velocity of the cutter is in the range of 5 to 15 m/sec and the targeted extruder rate is attained.

Regarding the requirement (2) described above, in order to narrow the particle size distribution (that is, in order to increase the proportion of the pellets providing a maximum weight fraction), a heat-channel die may be used, which can eliminate uniformity of temperature among the die holes.

In order to narrow the particle size distribution still more, in addition to using the heat-channel die, preferably the circumferential velocity of the cutter blades is adjusted in the range of 5 to 15 m/sec and the flow rate of the polymer in the die hole is adjusted in the range of 0.4 m/sec or lower. For example, in Example 1 described later, when the circumferential velocity of the cutter is brought close to 15 m/sec, the weight proportion described above is more lowered. Further, in Example 1, when the flow rate in the die hole is brought close to 0.4 m/sec, the value of the weight proportion becomes more lowered.

Regarding the requirement (3), preferably the circumferential velocity of the cutter blades is adjusted in the range of 5 to 15 m/sec and the flow rate of the polymer in the die hole is adjusted in the range of 0.4 m/sec or lower depending on the melt viscosity of the polymer. Further, for example, at the same flow rate of the polymer, when the circumferential velocity of the cutter blades is increased, the average value of L/D is moved away from 1, and when the circumferential velocity of the cutter blades is decreased, the average value is brought close to 1.

The $D_{ave}$ is regulated similarly to that in the requirement (1), for example, in Example 1, when the number of the cutter blades is decreased, the $D_{ave}$ becomes larger.

It is also preferable that powders and/or liquid adheres to the surface of the pellets. Namely, it is also preferable that the first pellets according to the present invention are pellets in which powders and/or liquid adheres to the surface thereof and which are obtained by sticking powders and/or liquid thereon. The pellet or the collective thereof, to which the powders and/or liquid adheres, is also referred to as the pellet or the collective thereof in which the powders or the like adheres thereon, respectively.

Hereinafter, powders and liquid used in the present invention will be described.

[Powders]

The powders used in the present invention have an average particle size in the range of usually 50 μm or less, preferably 0.1 to 50 μm, more preferably 1 to 30 μm, and still more preferably 1 to 25 μm. The average particle size can be determined by the laser diffraction method, and for example, can be measured with a Shimadzu particle size distribution analyzer of type SALS-2000A.

The powders preferably used in the present invention are, specifically, inorganic powders, organic powders, aliphatic acids, or aliphatic acid derivatives.

Specific examples of the inorganic powders may include silica, silica-alumina, diatomite, alumina, calcium carbonate, titanium oxide, magnesium oxide, pumice powders, pumice balloons, aluminum hydroxide, magnesium hydroxide, boron hydroxide, basic magnesium carbonate, dolomite, calcium sulfate, potassium titanate, barium carbonate, barium sulfate, calcium sulfite, talc, clay, mica, asbestos, calcium silicate, montmorillonite, bentonite, graphite, aluminum powders, molybdenum sulfide and the like. These inorganic powders may be used alone or in a combination of two or more kinds.

The organic powders may include, specifically, crystalline polyolefin powders, for example, preferably polyethylene, polypropylene, and the like. These organic powders may be used alone or in a combination of two or more kinds.

The aliphatic acids preferably used in the present invention may include, usually, a saturated or unsaturated higher fatty acid having 12 to 30 carbon atoms, specifically, lauric acid, myristic acid, palmitic acid, margaric acid, stearic acid, behenic acid, oleic acid, linolenic acid, α-eleostearic acid, β-eleostearic acid, and α-linolenic acid. Among these, stearic acid is preferable.

In addition, the aliphatic acid derivatives preferably used in the present invention may include the salts of the higher fatty acids, specifically, metal salts of the higher fatty acids, for example, sodium salts, potassium salts, magnesium salts, calcium salts, zinc salts, aluminum salts, iron salts, lithium salts and the like. Among these, stearates are preferable. Further, the higher fatty acid derivatives may also include higher fatty acid amides, esters and the like. Among these, amides or esters of stearic acid, erucic acid, oleic acid, itaconic acid, and montanic acid are preferable.

The fatty acids or fatty acid derivatives as described above may be used alone or as a mixture of two or more kinds in combination.

Among these, inorganic powders, fatty acids, and fatty acid derivatives are preferable. Silica, talc, calcium carbonate, mica, fatty acids, and fatty acid derivatives are more preferable. Talc and fatty acid metal salts are still more preferable.

[Liquid]

The liquid used in the present invention has a kinematic viscosity (JIS K-2283) of usually 0.5 to 100,000 cSt, preferably 100 to 5,000 cSt, and more preferably 200 to 1,000 cSt at 25° C. The kinematic viscosity can be measured by using a Cannon-Fenske viscometer tube No. 400 in accordance with JIS K2283 at 25° C.

Such liquid may specifically be at least one selected preferably from polyether polyol; aliphatic hydrocarbon oil; an alkane having 7 to 18 carbon atoms, substituted arbitrarily by OH, CH$_2$O, or ester; an alkene having 7 to 18 carbon atoms, substituted arbitrarily by OH, CH$_2$O, or ester; natural oil; naphthene oil; paraffin oil; aromatic oil; and silicone oil, particularly preferably from silicone oil, a polyether polyol having 2 to 20 carbon atoms (such as ethylene glycol), mineral oil, and an alcohol having 7 to 18 carbon atoms, and still more preferably from silicone oil. Examples of the alcohol having 7 to 18 carbon atoms may include, for example, lauryl alcohol, myristyl alcohol, cetyl alcohol, stearyl alcohol and the like. The silicone oils may include, specifically, polysiloxanes having a repeating unit represented by the following formula.

[Chemical Formula 2]

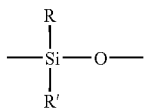

In the formula, R and R', each is independently an alkyl group, an aryl group, or a group in which the hydrogen atom of the foregoing groups is substituted by a halogen atom or the like. R and R' may be the same or different. In addition, R and R' may be partly substituted by a hydroxyl group or an alkoxy group.

Specific examples of the alkyl group may include a methyl group, an ethyl group, a propyl group, an isopropyl group, an n-butyl group, a s-butyl group, a t-butyl group and the like.

Specific examples of the aryl group may include a phenyl group a tolyl group and the like.

Specific examples of the halogen atom may include a fluorine atom, a chlorine atom, a bromine atom, and an iodine atom.

Specific examples of the alkoxy group may include a methoxy group, an ethoxy group, a propoxy group, an isopropoxy group and the like.

Among these polysiloxanes, dimethyl polysiloxane are particularly preferably used.

In addition, in the present invention, the liquid as described above may be used alone or in a mixture of two or more kinds in combination.

It is desirable that the amount of the powders which adheres to the surface of the pellets (hereinafter, also referred to simply as the adhering amount of the powder) is usually 0.005 to 3 parts by weight and preferably 0.005 to 2 parts by weight with respect to 100 parts by weight (the weight before the powders adhere) of the pellets.

It is desirable that the amount of the liquid which adheres to the surface of the pellets (hereinafter, also referred to simply as the adhering amount of the liquid) is usually 0.005 to 2 parts by weight, preferably 0.01 to 2 parts by weight, more preferably 0.01 to 1 part by weight, and still more preferably 0.01 to 0.5 part by weight with respect to 100 parts by weight (the weight before the liquid adheres) of the pellets.

For example, when the powders are used but the liquid is not, the adhering amount of the powder is preferably 0.01 to 2 parts by weight with respect to 100 parts by weight of the pellets.

For example, when both powders and liquid are used, the adhering amount of the powder is more preferably 0.01 to 0.5 part by weight and particularly preferably 0.01 to 0.3 parts by weight with respect to 100 parts by weight (the weight before both liquid and powders adhere) of the pellets. In this case, the adhering amount of the liquid is more preferably 0.01 to 0.5 part by weight and particularly preferably 0.01 to 0.03 part by weight with respect to 100 parts by weight of the pellets. Within this range, an excellent blocking resistance is exerted, and also it is considered that the physical properties are less affected when the pellets are used for the molding.

For example, when only the liquid is used, it is desirable that the adhering amount of the liquid is usually 0.005 to 2 parts by weight, preferably 0.01 to 2 parts by weight, more preferably 0.01 to 1 part by weight, and still more preferably 0.01 to 0.5 part by weight with respect to 100 parts by weight of the pellets.

The adhering amount of liquid (C), for example, in the case of silicone oil, can be quantified by preparing a calibration curve in advance and detecting Si with fluorescent X-rays. The adhering amount of powders (B), in the case of an inorganic compound such as talc, can be quantified by burning organic matters at 600° C. In the case of calcium stearate, the adhering amount can also be quantified by preparing a calibration curve in advance and detecting Ca with fluorescent X-rays.

As the method for allowing the powders and/or liquid to adhere to the surface of the pellets, a method in which the pellets and the powders and/or liquid are mechanically mixed so that the powders and/or liquid may adhere to the surface of the pellets, is preferred. Specific examples of the method for allowing the powders and/or liquid to adhere may include methods below:

(1) the pellets and the liquid are mechanically mixed according to a conventional method so that the liquid may adhere to the surface of the pellets, and then the powders are dusted on the surface of the pellets to allow the powders and liquid to adhere to the surface of the pellets; or (2) the polymer is pelletized by melt extrusion, through an extruder equipped with a so-called underwater cut pelletizer, into water containing the liquid finely dispersed therein by addition of a known surfactant (e.g., soap). Thereby the liquid is allowed to adhere to the surface of the pellets. Then powders are dusted on the surface of the pellets to allow the powders and liquid to adhere to the surface of the pellets.

In this way, the surface of the pellets is coated with the powders and liquid.

[Blocking Resistance]

When the first pellets (particularly, in the case of pellets in which the powders or the like adheres thereon) is subjected to a blocking force test in which a blocking force of the pellets is measured in the following manner, after the pellets are left under a load at 35° C. for 24 hours and then further left at −10° C. for 7 days, the blocking force provides a value of 35 N or less. As this value becomes smaller, the pellets are less stuck together and exhibit an excellent blocking resistance.

Figure 2:
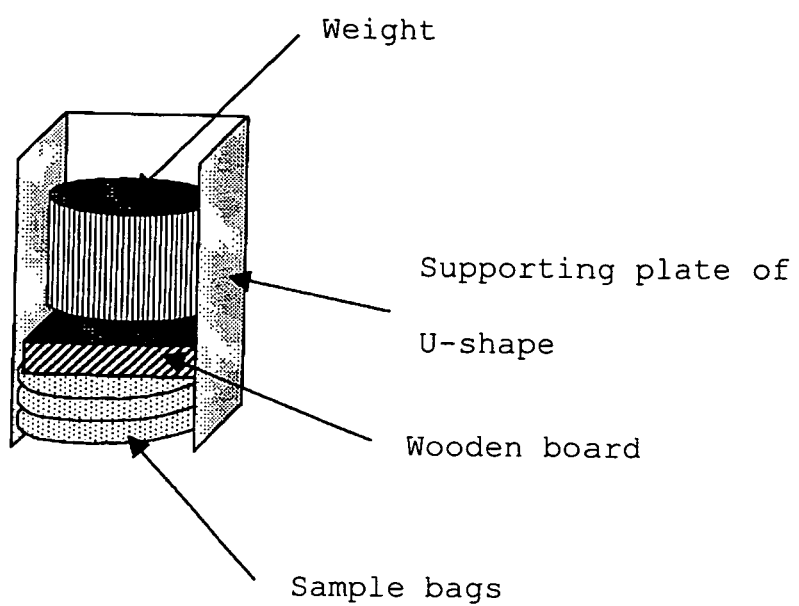
FIG. 2 illustrates a method for measuring blocking force.

The blocking force test is performed as follows. In a No. 6 standard poly-bag with 210 mm long and 100 mm wide, 95 g of pellets are packed, and the open end of the poly-bag is folded to reduce the length in the longitudinal direction of the poly-bag to 90 mm and fixed with cellophane tape. Three sample bags packed with the pellets are prepared as described above. A brace of U-shape (supporting plate of channel-shape) is placed in a test room at an ambient temperature of 35° C. in advance. One bag is placed inside of the supporting plate of U-shape in a manner that the length-by-width face of the bag touches the floor face, and then two bags are stacked on the one bag (see FIG. 2). After a wooden board with 7 mm thick is placed on the sample bags, 10 kg of weight is placed on the wooden board. The force applied by the weight is equal to the force applied to a bag placed at the bottom of a stack of 11 to 13 bags that are stacked perpendicularly (in a height direction) in a manner that the length-by-width face of the bag touches the floor face, wherein each bag is packed with 25 kg pellets and has a size of 70 cm long, 48 cm wide, and 14 cm high when the bag is packed. The load in this case is 0.11 kg/cm$^2$ according to the calculation. The weight is supported by the brace of U-shape, because the bags lose balance and fall down when the weight is placed on the sample bags. After 24 hours, a set of the test assembly including the sample bags, the wooden board, the weight, and the plate of U-shape is transferred as it is to another test room kept at an ambient temperature of −10° C. in advance. One week after the transfer, the weight and wooden board are removed from the sample bags, and the poly-bags are taken out of the test room. The three sides of the sample bags are cut and opened with a cutter knife. After the poly-bags are peeled off, a push-pull gauge (a type FGC-5B manufactured by NIDEC-SHIMPO CORPORATION, with a φ12 push adaptor) is pushed at the center portion of the sample, so as to measure a maximum force (blocking force) required to break the pellet blocking. The blocking force is measured for three bags respectively to determine the average value. In the pellets according to the present invention, the blocking force as measured by the blocking test is preferably 25 to 1 N and more preferably 15 to 1 N.

<First Package>

A package according to the present invention is composed of a container packed with the first pellets in an amount of 15 to 1,500 kg. The container is preferably a plastic box, a plastic bag, a paper bag, a cardboard box, or a flexible container.

<Second Pellets>

Second pellets according to the present invention is characterized by satisfying the following requirements (Z) and (4):

(Z) the pellet comprises a polymer (A) having an elastic modulus in tension (initial elastic modulus as measured by a method in accordance with ASTM D-638-03) of 100 MPa or less; and (4) the pellets have a blocking force of 35 N or less as measured in a testing in which the blocking force is measured after the pellets are left under a load at 35° C. for 24 hours and still left at −10° C. for 7 days.

The polymer (A) used for the second pellets according to the present invention, and preferred embodiments thereof are the same as those in the polymer (A) used for the first pellets. Further, the kinds, relative amounts, preferred embodiments and the like of the thermoplastic resin (x) contained as an arbitrary component and the additives optionally used, are all the same as those in the first pellets.

The polymer (A) is preferably a polymer having a structural unit derived from an α-olefin.

The polymer having a structural unit derived from the α-olefin is preferably a copolymer having a structural unit derived from two or more kinds of α-olefins.

The copolymer having a structural unit derived from two or more kinds of α-olefins is preferably a copolymer (A-i) having a structural unit derived from ethylene and a structural unit derived from an α-olefin having 3 or more carbon atoms.

The copolymer having a structural unit derived from two or more kinds of α-olefins is preferably a copolymer (A-ii) having a structural unit derived from propylene and a structural unit derived from an α-olefin having 2 or more carbon atoms except for propylene.

In the second pellets according to the present invention, (4) when the pellets are subjected to a blocking force test in which a blocking resistance of the pellets is measured after the pellets are left under a load at 35° C. for 24 hours and then further left at −10° C. for 7 days, the blocking force measured is 35 N or less, preferably from 25 N to 1 N, and more preferably from 15 N to 1N. As this value becomes smaller, the pellets are less stuck together and exhibit an excellent blocking resistance. Within this range, particularly even when the pellets are stored and used in a cold region after stored at high temperatures under a load, the pellets are less stuck together.

The second pellets according to the present invention are preferably pellets in which powders and/or liquid adheres on the surface of the pellets. In the second pellets, the explanation (including physical properties, kinds, adhering amount, and adhering method, for example) about the powders and liquid are the same as that of the powders and liquid described in the first pellets, and thus the description about the explanation is skipped.

In addition, the second pellets according to the present invention is not particularly limited as long as the requirements (Z) and (4) are satisfied, but for example, more preferably either (1) or (2) explained in the first pellets is satisfied, and particularly preferably both (1) and (2) are satisfied.

(1) The pellets have an average weight per 30 pellets in the range of 0.80 to 2.00 g, preferably 0.90 to 1.80 g, more preferably 0.95 to 1.8 g, and still more preferably 1.00 to 1.8 g. That is, the average value of the total weight of 30 pellets selected at random from the collective of pellets is in the above range.

The average weight of 30 pellets can be measured by the same method as that explained in the requirement of (1) for the first pellets.

(2) The pellets have a particle size distribution obtained by sieving in which pellets providing a maximum weight fraction account for 90 to 100% and preferably 97 to 100% of the pellets.

This proportion can be measured by the same method as that explained in the requirement of (2) for the first pellets.

Further, it is also one preferred embodiment of the second pellets that the requirement (3) for the first pellets is satisfied in addition to (1) and (2), if necessary.

The method for producing the second pellets according to the present invention may include the same method as that for producing the first pellets.

In the requirement (4) of the present invention, the blocking force may be lowered by controlling the requirement (1) such that the average weight per 30 pellets is as large as possible in the range of 0.8 to 2.0 g and controlling the requirement (2) such that the index in the particle size distribution is as close as possible to 100%. Where necessary, it is also effective to control the requirement (3) such that the $L_{ave}/D_{ave}$ value is close to 1.00.

<Second Package>

A second package according to the present invention is composed of a container packed with the second pellets in an amount of 15 to 1,500 kg. The container is preferably a plastic box, a plastic bag, a paper bag, a cardboard box, or a flexible container.

<Use of Pellets>

The first or second pellets are used suitably even after the pellets are allowed to stand for 24 hours or more, for example, for 72 hours or more in the state that part of the pellets are left under a load. In practice, the pellets are supplied to a molding machine or the like to use.

In this occasion, the pellets are usually allowed to stand at a temperature of 20 to 45° C. Even after standing still, the pellets exhibits little blocking among the pellets. In particular, blocking among the pellets is little found when the pellets are stored and used at low temperatures after standing still. As describe above, the pellets has an excellent blocking resistance.

Note that, the first or second pellets may be allowed to stand, specifically, in the state of a package under the conditions described above. An excellent blocking resistance is exerted also in this case.

A molded article can be produced directly by using the first or second pellets according to the present invention. In this occasion, operations such as freeing up the pellets by hands or with hard tools or the like are dramatically eliminated when the pellets are supplied to a molding machine. Thus, the pellets provide excellent operability and safety. Upon producing a molded article, various molding methods such as injection molding, sheet extrusion molding, inflation molding, vacuum molding, hollow molding, press molding, profile extrusion molding, foam molding and the like are applied for the pellets, and various kinds of molded articles may be obtained.

Furthermore, even in the case where powders and/or liquid that is arbitrary components are used, the first or second pellets according to the present invention can exhibit a blocking resistance with a small portion of the powders and/or liquid, and thus deterioration of the physical properties is suppressed when the pellets are used in the form of a thermoplastic resin composition described below. In the case of a molded article formed from the thermoplastic resin composition is coated with paint, the bonding strength between the molded article and paint coating is high, and the coating is hardly removed.

<Thermoplastic Resin Composition>

By melt-kneading the first or second pellets with other thermoplastic resins, a thermoplastic resin composition can be produced.

As described above, since the first pellets according to the present invention satisfies the requirements (1) to (3), a still more excellent blocking resistance can be obtained with a smaller adhering amount of powders and/or liquid. Therefore, when the thermoplastic resin composition is produced using the pellets in which the powders or the like adheres thereon and then a molded article is produced from this composition, the deterioration of the physical properties of the molded article caused by the powders and/or liquid mixed therein is prevented.

Further, since the second pellets according to the present invention satisfies the requirement (4), a still more excellent blocking resistance can be obtained with a smaller adhering amount of the powders and/or liquid. Therefore, when the thermoplastic resin composition is produced using the pellets in which the powders or the like adheres thereon and then a molded article is produced from this composition, the deterioration of the physical properties of the molded article caused by the powders and/or liquid mixed therein is prevented.

The other thermoplastic resins are not particularly limited, but may include, for example, a polyolefin that has a melting point of 80° C. or higher as measured with DSC, preferably 81 to 180° C., and preferably 121 to 170° C. The polyolefins may include a homopolymer or copolymer of an α-olefin having 2 to 20 carbon atoms. Among the polyolefins, an ethylene homopolymer, a copolymer of ethylene and an α-olefin having 3 to 20 carbon atoms, a propylene homopolymer, or a copolymer of propylene and an α-olefin having 2 to 20 carbon atoms except for propylene is preferable. In the DSC measurement, the same methods as that used in the measurement of the melting point of the polymer (A) can be used.

The copolymers of ethylene and an α-olefin having 3 to 20 carbon atoms may include, for example, a copolymer containing a structural unit derived from ethylene in an amount of 60 to 99 mol % and preferably 78 to 85 mol % when the total of the structural unit derived from ethylene and a structural unit derived from the α-olefin having 3 to 20 carbon atoms is 100 mol %. The MFR of the ethylene homopolymer or the copolymer of ethylene and α-olefin having 3 to 20 carbon atoms measured at 190° C. under a load of 2.16 kg is not particularly limited, but may be 0.01 to 200 g/10 min. Further, the copolymers of propylene and an α-olefin having 2 to 20 carbon atoms except for propylene may include, for example, a copolymer containing a structural unit derived from propylene in an amount of 60 to 99 mol % and preferably 70 to 85 mol % when the total of the structural unit derived from propylene and a structural unit derived from the α-olefin having 2 to 20 carbon atoms except for propylene is 100 mol %. The MFR of the propylene homopolymer or the copolymer of propylene and α-olefin having 2 to 20 carbon atoms except for propylene measured at 190° C. under a load of 2.16 kg is not particularly limited, but may be 0.01 to 400 g/10 min.

Upon producing the thermoplastic resin composition, the first or second pellets and the other thermoplastic resin are used in a proportion of preferably 1/99 to 99/1 (by mass).

In addition, various kinds of molded articles can be formed from the thermoplastic resin composition by various molding methods such as injection molding, sheet extrusion molding, inflation molding, vacuum molding, hollow molding, press molding, profile extrusion molding, foam molding and the like.

Further, the molded articles may have a decorative layer laminated thereon at least partly. The decorative layer may be formed by coating. By using the thermoplastic resin composition, when a molded article is coated with paint, a bonding strength between the molded article and paint-coating is high, and the coating is hardly removed.

Example 1

Production of Pellets

An ethylene/butene copolymer having a density of 864 kg/m$^3$, an MFR of 3.6 g/10 min (190° C., 2.16 kg of load), an elastic modulus in tension (initial elastic modulus as measured by the method in accordance with ASTM-D-638-03) of 5 MPa, and a Tm of 46° C. was supplied to a twin-screw extruder, and melt-kneaded. The extruder was a co-directional rotation type equipped with a heat channel-die and cutter blades that rotate while contacting to the die face, having a screw diameter of 65 mm and an L/D of 42. The heat channel-die had a die diameter (at a portion with a hole) of 150 mm, a die hole diameter of 3.5 mm, 30 die holes, and two cuter blades. The ethylene/butene copolymer melt-kneaded was extruded through the heat channel-die at a resin temperature of an inlet of the die of 200° C., and cut with the cutter blades to give pellets. The linear velocity of the polymer in the die was 0.18 m/sec. During the operation, the die temperature was 150° C., and the revolution of the cutter was 1250 rpm. The circumferential velocity of the cutter blades was 10 m/sec. The resulting pellets were cooled in water, and then dried.

Washing of Pellets

After that, 5 kg of the resulting pellets were put in a 10 liter bucket (265 mm in diameter, 240 mm in depth), and the bucket was filled with water. A domestic detergent ("Mama Lemon", manufactured by Lion Corporation) in an amount of 10 cc was added to the bucket, and the resultant was stirred for 10 minutes. The pellets stirred and washed were put in a bowl with a mesh to drain, and the pellets drained were transferred to another 10-liter bucket. Clean water (water from a public water supply) was poured into the bucket and the resultant was stirred for 5 minutes. The pellets were transferred to a bowl with a mesh to drain. The rinsing operation (after the clean water was poured, the resultant was stirred and then transferred to the bowl to drain) was repeated three times in total. Then the pellets were transferred in a poly-bag having 10 or more holes with 0.5 mm at the bottom, and fully dried by introducing dry air into the bag for one week. Note that, during the drying, the pellets were fluidized at least one time a day in the poly-bag.

For the pellets, the average weight of 30 pellets, proportion of the pellets providing a maximum weight fraction, and $L_{ave}/D_{ave}$ that were determined by the methods described above are shown in Table 1. The shape of the pellet obtained here was found to be close to ellipsoidal sphere by visual inspection, therefore, the $L_{ave}/D_{ave}$ was measured by assuming the shape of the pellet to be the ellipsoidal sphere.

Adhering of Powders

Ten kilograms of the pellets washed were charged in a 75 liter Henschel mixer manufactured by Mitsui Mining Co., Ltd., and then calcium stearate powders (manufactured by NOF CORPORATION, having an average diameter of 4 μm) were added in an amount of 0.25 wt %. Both were sufficiently stirred at a revolution of 100 rpm for 10 minutes, pellets in which calcium stearate powders adheres on the surface of the pellets were obtained.

Subsequently, blocking resistance was evaluated by the test method described above. The results are shown in Table 1.

Note that, the difference was not observed in the results of the blocking resistance test between with and without washing.

Example 2

Up to "washing of pellets", the procedure was performed similarly to that in Example 1.

Ten kilograms of the pellets washed were charged in a 75 liter Henschel mixer manufactured by Mitsui Mining Co., Ltd. Then, silicone oil ("SH200", manufactured by Dow Corning Toray Co., Ltd.) was added in an amount of 0.02 wt %. The resultant was stirred at a revolution of 100 rpm for 5 minutes. 0.15 wt % of calcium stearate powders (manufactured by NOF CORPORATION, having an average particle diameter of 4 μm) were then added, both were sufficiently stirred at a revolution of 100 rpm for 10 minutes, and consequently pellets in which calcium stearate powders and silicone oil adheres on the surface of the pellets was obtained. The results of the blocking resistance test are shown in Table 1.

Example 3

Pellets were produced and washed as in the procedures of "Production of pellets" and "Washing of pellets" in Example 1, except that the number of die holes was changed to 20. For this the pellets, the average weight of 30 pellets, proportion of the pellets providing a maximum weight fraction, and $L_{ave}/D_{ave}$ that were determined by the methods described above are shown in Table 1. The shape of the pellet obtained here was found to be close to ellipsoidal sphere by visual inspection, therefore, the $L_{ave}/D_{ave}$ was measured by assuming the shape of the pellet to be the ellipsoidal sphere.

After that, similarly to the procedure of "Adhering of powders" in Example 1, pellets in which calcium stearate powders adheres on the surface of the pellets were obtained. The results of the blocking resistance test are shown in Table 1.

Comparative Example 1

Pellets were produced and washed similarly to the procedures of "Production of pellets" and "Washing of pellets" in Example 1, except that the number of the cutter blades was changed from 2 to 4. For the pellets, the average weight of 30 pellets, proportion of the pellets providing a maximum weight fraction, and $L_{ave}/D_{ave}$ that were determined by the methods described above are shown in Table 1. The shape of the pellet obtained here was found to be close to ellipsoidal sphere by visual inspection, therefore, the $L_{ave}/D_{ave}$ was measured by assuming the shape of the pellet to be the ellipsoidal sphere.

After that, similarly to the procedure of "Adhering of powders" in Example 1, pellets in which calcium stearate powders adheres on the surface of the pellets were obtained. The results of the blocking resistance test are shown in Table 1.

Comparative Example 2

Washing of Pellets

Five kilograms of pellets made from an ethylene/octene copolymer ("ENGAGE8842", manufactured by Dow Chemical Company, having an MFR of 1.0 g/10 min at 190° C. under a load of 2.16 kg and a density of 857 kg/m$^3$) were put in a 10 liter bucket (265 mm in diameter, 240 mm in depth), and the bucket was filled with water. Further, 10 cc of a domestic detergent ("Mama Lemon", manufactured by Lion Corporation) were added to the bucket, and the resultant was stirred for 10 minutes. The pellets stirred and washed were put in a bowl with a mesh to drain, and the pellets drained were transferred to another 10-liter bucket. Clean water (water from a public water supply) was poured into the bucket and the resultant was stirred for 5 minutes. The pellets were transferred to a bowl with a mesh to drain. The rinsing operation (after the clean water was poured, the resultant was stirred and then transferred to the bowl to drain) was repeated three times in total. Then the pellets were transferred to a poly-bag having 10 or more holes with 0.5 mm at the bottom, and fully dried by introducing dry air into the bag for one week. Note that, during the drying, the pellets were fluidized at least one time a day in the poly-bag.

For the pellets, the average weight of 30 pellets, proportion of the pellets providing a maximum weight fraction, and $L_{ave}/D_{ave}$ that were determined by the methods described above are shown in Table 1. According to the result of visual inspection of the shape of the pellet obtained here, the $L_{ave}/D_{ave}$ was measured by assuming the shape of the pellet to be the ellipsoidal sphere.

Adhering of Powders

Ten kilograms of the pellets washed were charged in a 75 liter Henschel mixer manufactured by Mitsui Mining Co., Ltd., and then calcium stearate powders (manufactured by NOF CORPORATION, having an average diameter of 4 μm) were added in an amount of 0.25 wt %. Both were sufficiently stirred at a revolution of 100 rpm for 10 minutes, pellets in which calcium stearate powders adheres on the surface of the pellets were obtained. The results of the blocking resistance test are shown in Table 1.

Comparative Example 3

Except that pellets made from an ethylene/butene copolymer ("ENR7467", manufactured by Dow Chemical Company, having an MFR of 1.0 g/10 min at 190° C. under a load of 2.16 kg and a density of 863 kg/m$^3$) were used in place of the copolymer used in Comparative Example 2, the pellets were washed similarly to the procedure of "Washing of pellets" in Comparative Example 2. For the pellets washed, the average weight of 30 pellets, proportion of the pellets providing a maximum weight fraction, and $L_{ave}/D_{ave}$ that were determined by the methods described above are shown in Table 1. The shape of the pellet obtained here was found to be closer to the shape shown on the right in the lower column of FIG. 1 (L is diameter and D is height), among cylindrical shapes by visual inspection, therefore, the $L_{ave}/D_{ave}$ was measured by assuming the shape of the pellet to be the cylinder shown on the right in the lower column of FIG. 1.

Then, as in the procedure of "Adhering of powders" in Comparative Example 2, pellets in which calcium stearate powders adheres on the surface of the pellets were obtained. The results of the blocking resistance test are shown in Table 1.

TABLE 1

|  |  | Example 1 | Example 2 | Example 3 | Comparative Example 1 | Comparative Example 2 | Comparative Example 3 |
| --- | --- | --- | --- | --- | --- | --- | --- |
| Polymer |  | Ethylene/butene copolymer | Ethylene/butene copolymer | Ethylene/butene copolymer | Ethylene/butene copolymer | Ethylene/octene copolymer | Ethylene/butene copolymer |
| Trade name | — | — | — | — | — | EG8842 | ENR7467 |
| Density | kg/m3 | 864 | 864 | 864 | 864 | 857 | 863 |
| 30 pellet weight | g | 1.00 | 1.00 | 1.45 | 0.51 | 1.03 | 1.07 |
| Proportion of the pellets providing a maximum weight fraction | wt % | 98.7 | 98.7 | 97.6 | 98.4 | 83.1 | 97.9 |
| $L_{ave}$ value/$D_{ave}$ value | mm/mm | 4.5/3.3 | 4.5/3.3 | 5.0/4.1 | 4.3/2.7 | 4.6/2.9 | 4.0/2.1 |
| $L_{ave}/D_{ave}$ | — | 1.36 | 1.36 | 1.21 | 1.59 | 1.58 | 1.90 |
| Adhering amount of powders or liquid | — | Calcium stearate 0.25 wt % | Si oil/calcium stearate = 0.02/0.15 wt % | Calcium stearate 0.25 wt % | Calcium stearate 0.25 wt % | Calcium stearate 0.25 wt % | Calcium stearate 0.25 wt % |
| Blocking force | N | 11 | 10 | 3 | 61 | 70 | 70 |

The invention claimed is:

1. Pellets satisfying all of the following requirements (Z), (1), (2), (3) and (4):
   - (Z) the pellet comprises a polymer (A) having an elastic modulus in tension (an initial elastic modulus as measured by a method in accordance with ASTM D-638-03) of 100 MPa or less;
   - (1) the pellets have an average weight per 30 pellets in the range of 0.80 to 2.00 g;
   - (2) the pellets have a particle size distribution obtained by sieving in which pellets providing a maximum weight fraction account for 90 to 100% of the pellets;
   - (3) the pellets have a $L_{ave}/D_{ave}$ value in the range of 1.00 to 1.5 wherein $L_{ave}$ and $D_{ave}$ are averages of the length L and the diameter D, respectively, of randomly selected 20 pellets and the length and the diameter are determined such that the length is larger than the diameter; and
   - (4) the pellets have a blocking force of 35 N or less as measured in a testing in which the blocking force is measured after the pellets are left under a load at 35° C. for 24 hours and further at −10° C. for 7 days.

2. The pellets according to claim 1, wherein the polymer (A) is a polymer having a structural unit derived from an α-olefin.

3. The pellets according to claim 2, wherein the polymer having a structural unit derived from an α-olefin is a copolymer having a structural unit derived from two or more kinds of α-olefins.

4. The pellets according to claim 3, wherein the copolymer having a structural unit derived from two or more kinds of α-olefins is a copolymer (A-i) having a structural unit derived from ethylene and a structural unit derived from an α-olefin having 3 or more carbon atoms.

5. The pellets according to claim 3, wherein the copolymer having a structural unit derived from two or more kinds of α-olefins is a copolymer (A-ii) having a structural unit derived from propylene and a structural unit derived from an α-olefin having 2 or more carbon atoms except for propylene.

6. The pellets according to any of claims 1 to 5, wherein powders and/or liquid adheres on the surface of the pellets.

7. A package comprising a container packed with the pellets according to claims 1 to 5 in an amount of 15 to 1,500 kg.

* * * * *